(12) United States Patent
Nakatani et al.

(10) Patent No.: US 8,107,231 B2
(45) Date of Patent: Jan. 31, 2012

(54) COVER OPENING AND CLOSING DEVICE AND INFORMATION PROCESSING UNIT

(75) Inventors: Hitoshi Nakatani, Osaka (JP); Shintaro Tanaka, Osaka (JP); Haruka Kaneko, Kyoto (JP); Yoshiaki Nagamura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/547,056

(22) Filed: Aug. 25, 2009

(65) Prior Publication Data

US 2010/0046159 A1 Feb. 25, 2010

(30) Foreign Application Priority Data

Aug. 25, 2008 (JP) ................................ 2008-215655

(51) Int. Cl.
*H05K 5/00* (2006.01)
*H05K 7/00* (2006.01)

(52) U.S. Cl. .......... 361/679.33; 361/679.55; 361/679.56

(58) Field of Classification Search ............. 361/679.36, 361/679.37, 679.55, 679.59, 679.33, 679.56
See application file for complete search history.

(56) References Cited

U.S. PATENT DOCUMENTS

| 6,385,154 | B1 * | 5/2002 | Kokubo et al. | 720/733 |
| 7,574,715 | B2 * | 8/2009 | Springer et al. | 720/647 |
| 2004/0228264 | A1 | 11/2004 | Shimada et al. | |

FOREIGN PATENT DOCUMENTS

JP 2004-326499 A 11/2004

* cited by examiner

*Primary Examiner* — Anthony Haughton
(74) *Attorney, Agent, or Firm* — Hamre, Schumann, Mueller & Larson, P.C.

(57) ABSTRACT

In the cover opening and closing device of the present invention, among clearances between a cover and a first cabinet, a clearance 12a closest to protrusions on the first cabinet is made to have a larger width than other clearances. Thus, even when the protrusions are accidentally bumped against the wall or the like and the first cabinet in the vicinity of the protrusions is locally deformed, it is possible to absorb the deformation. Therefore, it is possible to reduce the possibility of the development of trouble in opening and closing the cover.

6 Claims, 4 Drawing Sheets

COVER OPENING AND CLOSING DEVICE AND INFORMATION PROCESSING UNIT

BACKGROUND OF INVENTION

1. Field of the Invention

The present invention relates to a cover opening and closing device that supports a cover in such a manner that the cover can be opened and closed. Further, the present invention relates to an information processing unit including the cover opening and dosing device.

2. Description of Related Art

As notebook computers have become more multifunctional in recent years, the number and the types of input/output ports for establishing connection with external devices have been increasing. Furthermore, models of notebook computers that come with a recording/reproducing device on which a rewritable recoding medium, such as a disk medium and a semiconductor memory, can be mounted have become widespread.

JP 2004-326499 A discloses a notebook computer including a disk driver into/from which a disk recording medium can be inserted/removed, and a disk cover for opening and dosing the disk driver. The disk cover disclosed by JP 2004-326499 A is placed turnably on the surface of the main body of the cabinet.

Conventionally, optional parts may be attached to a notebook computer in order to add new functions. The optional parts, when being attached to the notebook computer, may protrude from the surface of the cabinet of the notebook computer (hereinafter, the optional parts that protrude from the surface of the cabinet of the notebook computer when being placed will be referred to as "protrusions"). When such a notebook computer receives an impact caused by a drop, etc., the joint portions of the protrusions also receive the impact and part of the cabinet is deformed When the cabinet of the notebook computer is deformed, there may not be enough clearance necessary for opening and dosing a cover such as a disk cover (disclosed by JP 2004-326499 A), and consequently, it may not be possible for the cover to be opened or closed. Therefore, the protrusions themselves and their joint potions need to be reinforced to withstand a deformation.

However, the reinforcement of the protrusions results in an increase in the weight and the size of the cabinet or the main unit.

SUMMARY OF THE INVENTION

With the foregoing in mind, it is an object of the present invention to achieve a cover opening and dosing device capable of absorbing a local deformation caused by a certain amount of impact without increasing the weight and the size of an cabinet or a main unit, and an information processing unit including the cover opening and dosing device.

The cover opening and dosing device of the present invention is a cover opening and dosing device including: a cabinet including an opening; and a cover including a shaft that supports the opening such that the opening can be opened and closed. The cover further includes a cover main body capable of covering at least part of the opening, a shaft side in the vicinity of the shaft and an opposite side opposing the shaft side through the cover main body. When the cover closes the opening, a clearance width between the opposite side and an outer side of the opening opposed by the opposite side is larger than a clearance width between the shaft side and a shaft-side outer side of the opening opposed by the shaft side.

The information processing unit of the present invention is an information processing device including: a cabinet including a disk drive including an opening for inserting and removing a disk information medium, and an information processing portion for exchanging an information signal with the disk drive; and the cover opening and closing device.

According to the present invention, it is possible to provide a cover structure where an opening and closing operation can be performed without any problem even when the main unit receives an impact.

DETAILED DESCRIPTION OF THE INVENTION

A cover opening and closing device according to one embodiment of the present invention is a cover opening and closing device including: a cabinet including an opening; and a cover including a shaft that supports the opening such that the opening can be opened and closed. The cover further includes a cover main body capable of covering at least part of the opening, a shaft side in the vicinity of the shaft and an opposite side opposing the shaft side through the cover main body. When the cover closes the opening, a clearance width between the opposite side and an outer side of the opening opposed by the opposite side is larger than a clearance width between the shaft side and a shaft-side outer side of the opening opposed by the shaft side.

The cover opening and closing device according to one embodiment of the present invention, having the basic structure as described above, can be configured as follows.

In the cover opening and closing device according to one embodiment of the present invention, the cabinet further includes a plurality of side walls orthogonal to the cover main body when the cover closes the opening, and one of the plurality of side walls is provided with a holding portion that can be held to carry the cabinet.

In the cover opening and closing device according to one embodiment of the present invention, the opposite side is provided closer to the one of the plurality of side walls of the cabinet than the shaft side.

An information processing device according to one embodiment of the present invention is an information processing device including: a cabinet including a disk drive including an opening for inserting and removing a disk information medium, and an information processing portion for exchanging an information signal with the disk drive; and the cover opening and closing device.

Embodiment

Figure 1:
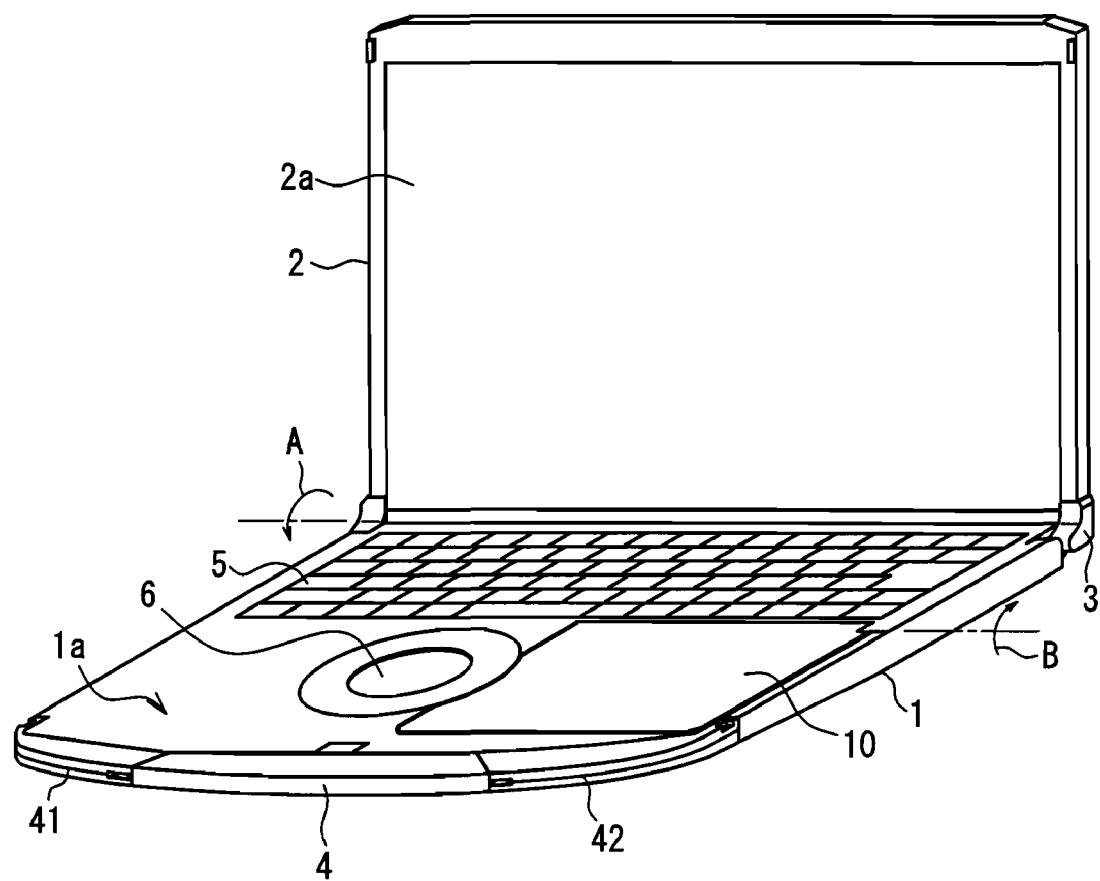
FIG. 1 is a perspective view showing the appearance of an information processing unit according to one embodiment of the present invention.
Figure 2:
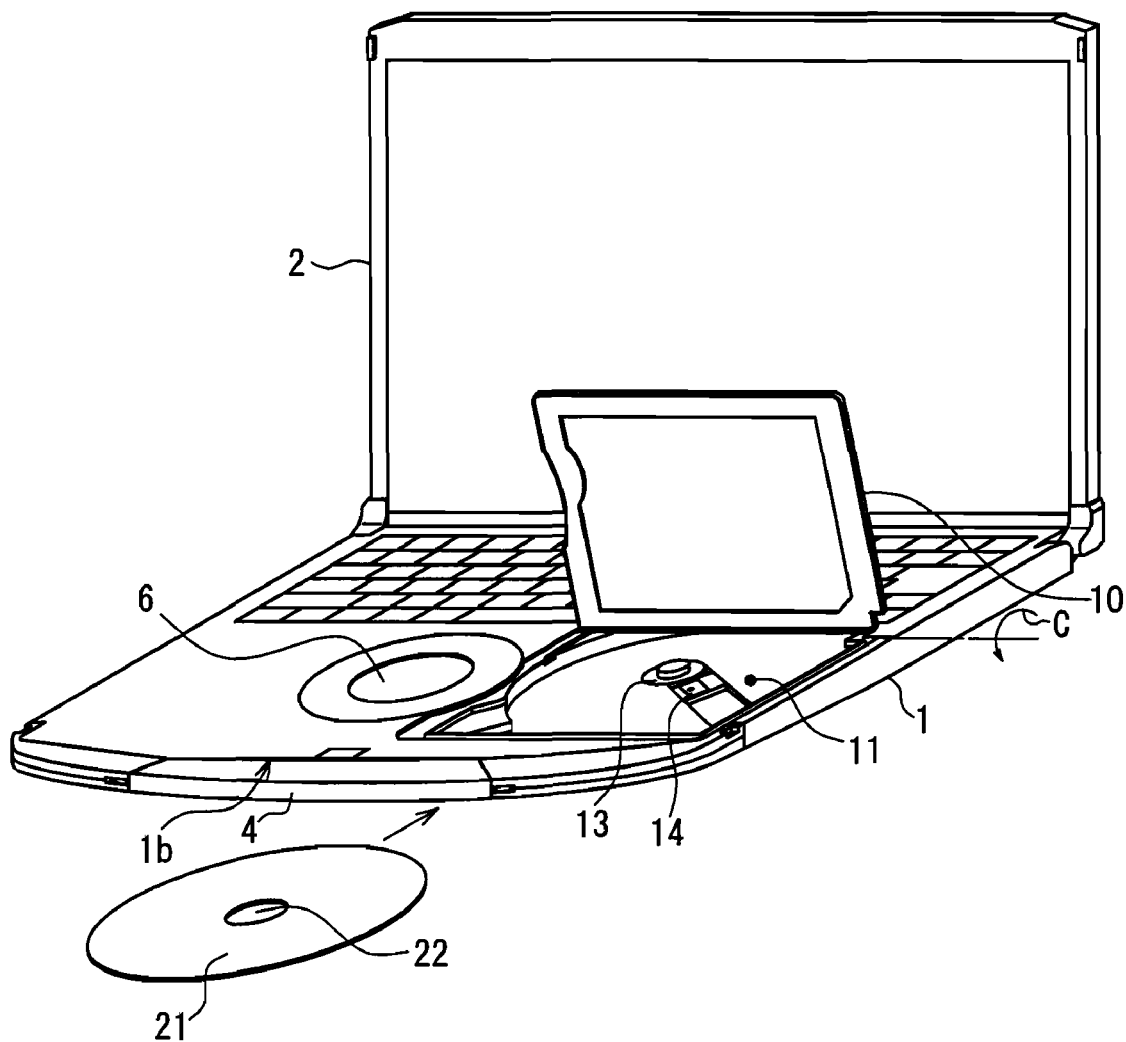
FIG. 2 is a perspective view showing the appearance of the information processing unit according to one embodiment of the present invention.

FIG. 1 is a perspective view of the appearance of an information processing unit according to the present embodiment, showing a notebook computer as an example of the information processing unit in a first state. FIG. 2 is a perspective view showing the notebook computer according to the present embodiment with a cover being opened. Although a notebook computer will be described in the present embodiment as an example of the information processing unit, any information processing unit may be used as long as it includes, like a mobile phone, a medical device, etc., a concave portion and a cover that can open and close the concave portion.

As shown in FIG. 1, the notebook computer includes a first cabinet 1 and a second cabinet 2. A circuit board on which a variety of electric elements are mounted, a hard disk drive, etc. are contained in the first cabinet 1. The second cabinet 2 includes a liquid crystal display 2a Each of the first cabinet 1 and the second cabinet 2 is supported turnably by hinge portions 3. By turning the second cabinet 2 from the position shown in FIG. 1 (the first state) in the direction indicated by the arrow A, the state of the notebook computer can be shifted to a second state where the liquid crystal display 2a and a keyboard 5 oppose each other at a close spacing.

Further, when the notebook computer is in the second state and the surface of the first cabinet 1 opposing the second cabinet 2 is defined as the "top side", a top surface 1a of the first cabinet 1 includes the keyboard 5 that can be used to input a variety of characters and a pointing device 6 that can be used to move a cursor displayed on the liquid crystal display 2a to desired positions. Further, a cover 10 supported turnably by a shaft 15 (see FIG. 3) is placed on the top surface 1a of the first cabinet 1. The both ends of the shaft 15 are supported by the first cabinet 1, and the portion between the both ends supports the cover 10.

Further, when the notebook computer is in the second state and a handle 4 side is defined as the "front side", a front side surface 1b (hereinafter referred to as a front surface of the first cabinet 1) of the first cabinet 1 includes the handle 4, and support members 41 and 42.

The first cabinet 1 includes a plurality of side surfaces (side walls) around the top surface 1a. The side surface 1b is one of the plurality of side surfaces.

A user can hold the handle 4 with the user's hand. The user can carry the notebook computer by holding the handle 4 with the user's hand. The both ends of the handle 4 in the longitudinal direction are respectively supported by the support members 41 and 42. The support members 41 and 42 protrude from the side surface 1b of the first cabinet 1. Further, the support members 41 and 42 are placed on the side surface 1b so as to be protruded relative to the upper end (that is, the edge of the second cabinet 2 on the handle 4 side in the second state) of the second cabinet 2 when the user holds the handle 4 of the notebook computer in the second state (not shown) with the user's hand. It should be noted that the handle 4 is an example of the holding member.

The cover 10 is supported by the first cabinet 1 turnably in the direction indicated by the arrow B (FIG. 1) or the direction indicated by the arrow C (FIG. 2). As shown in FIG. 2, the cover 10 can open and close a disk drive 11 placed on a concave portion in the first cabinet 1. A turntable 13, an optical pickup 14, etc. are placed in the disk drive 11. The turntable 13 can hold a disk medium 21 by being fitted to a circular hole portion 22 formed at the center of the disk medium 21. The optical pickup 14 can record information on the recording area of the disk medium 21 mounted on the turntable 13 by irradiating the recording area with a laser beam. The optical pickup 14 also can read information recorded on the disk medium 21 by irradiating the recording area of the disk medium 21 with a laser beam and receiving the light reflected by the recording area with a light receiving element.

Figure 3:
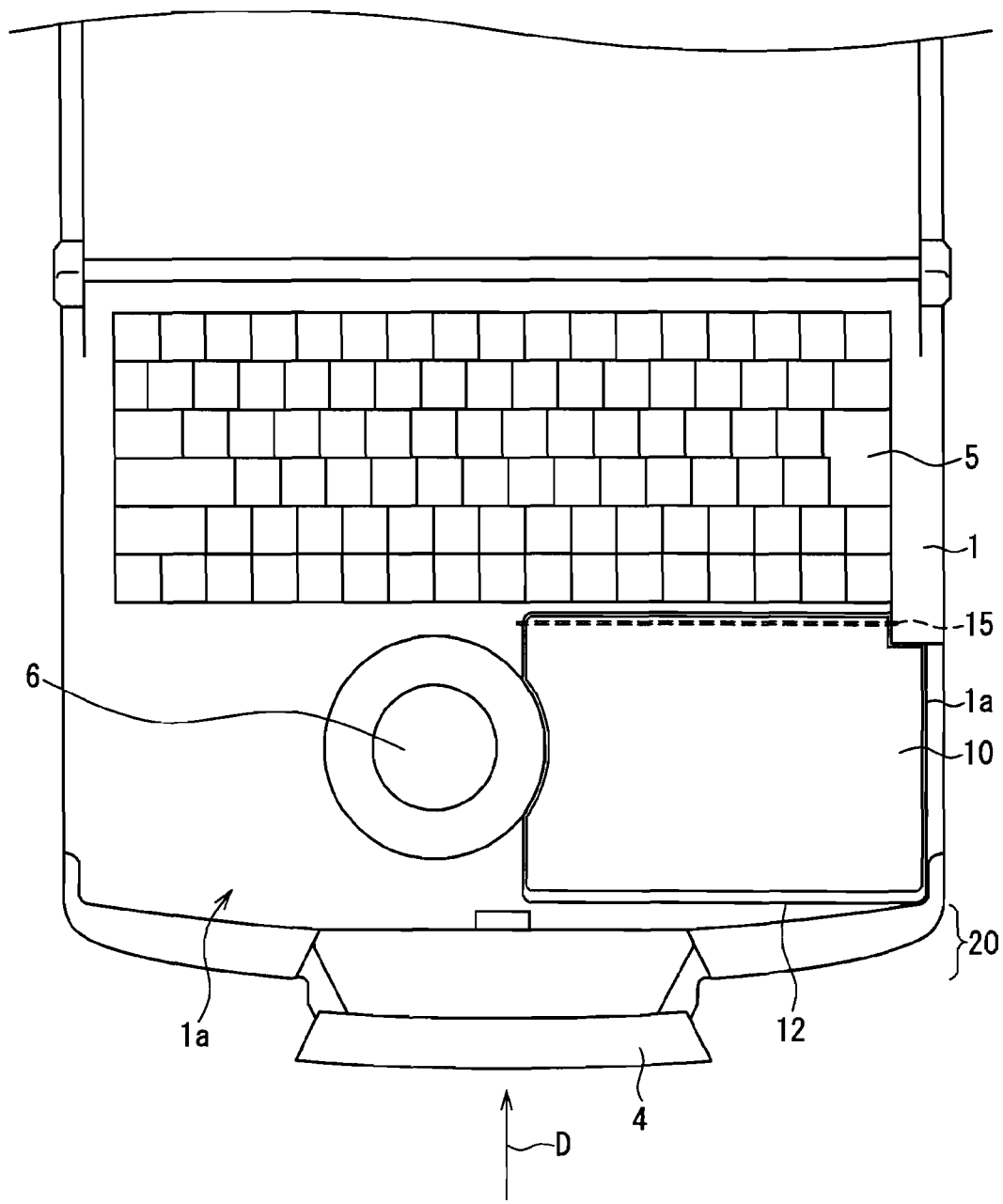
FIG. 3 is a plan view of a first cabinet.
Figure 4:
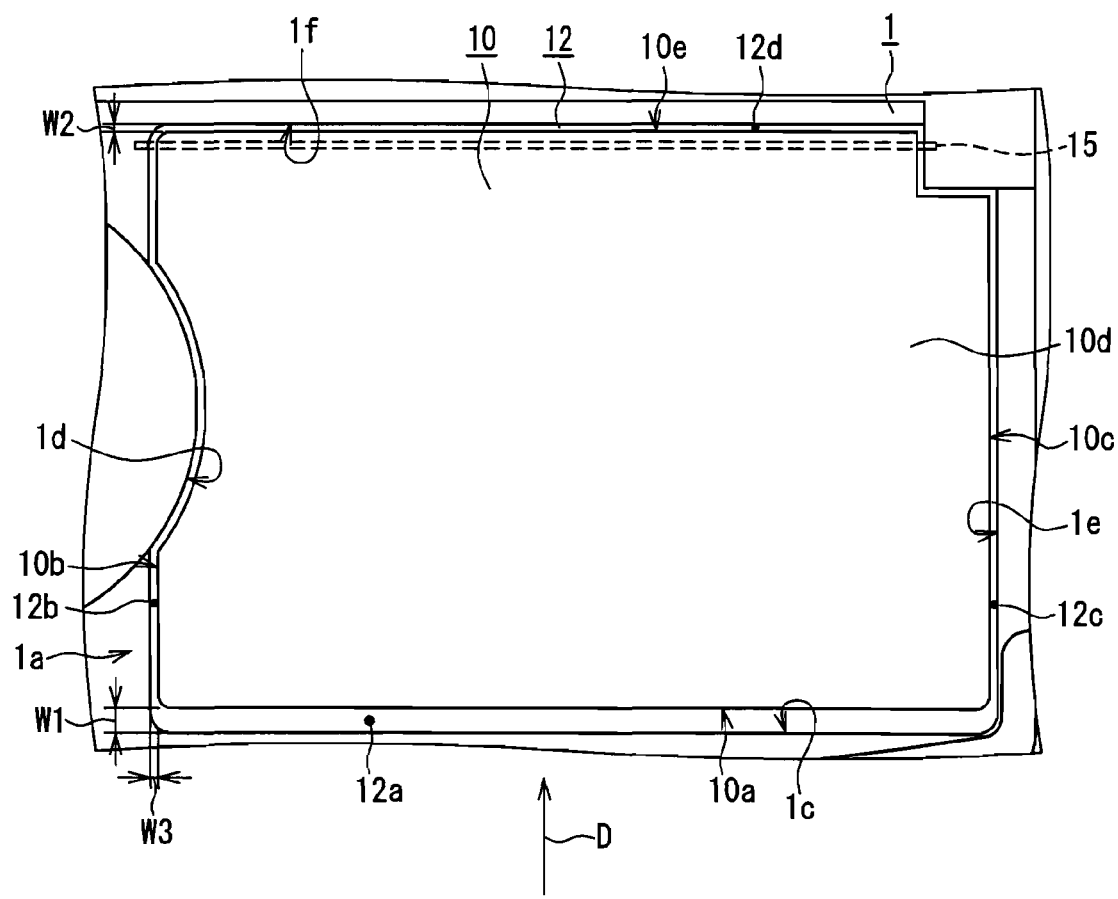
FIG. 4 is a plan view of principal portions in the vicinity of the cover shown in FIG. 3.

FIG. 3 is a plan view of the first cabinet 1. FIG. 4 is a plan view of the vicinity of the cover 10 shown in FIG. 3. As shown in FIG. 4, the cover 10 includes an opposite side 10a, a shaft side 10b, a shaft side 10c, a cover main body 10d and a shaft side 10e. The cover main body 10d can cover the disk dive 11 entirely or partially when the cover 10 is in the closed state. The cover main body 10d is surrounded by the opposite side 10a, the shaft side 10b, the shaft side 10c, and the shaft side 10e. The main plane of the cover main body 10d is orthogonal to the side surfaces (side walls) of the first cabinet 1. The shaft side 10e is placed in the vicinity of the shaft 15. The opposite side 10a and the shaft side 10e oppose each other through the cover main body 10d. The shaft side 10b and the shaft side 10c oppose each other through the cover main body 10d. Clearances 12 are formed between the cover 10 and the top surface 1a of the first cabinet 1.

The first cabinet 1 includes an outer side 1c, a shaft-side outer side 1d, a shaft-side outer side 1e and a shaft-side outer side 1f. The clearance 12 is surrounded by the outer side 1c, the shaft-side outer side 1d, the shaft-side outer side 1e and the shaft-side outer side 1f. That is, the outer side 1c, the shaft-side outer side 1d, the shaft-side outer side 1e and the shaft-side outer side 1f form an opening including the disk drive 11.

The clearances 12 are formed around the cover 10. In the present embodiment, a width W1 is made larger than widths W2 and W3. The width W1 is the width of a clearance 12a that is closest to the side surface 1b of the first cabinet 1 where the support member 42, etc., are placed. The width W2 is the width of a clearance 12d. The width W3 is the width of a clearance 12b (the same applies to a clearance 12c opposing the clearance 12b) that is closest to the pointing device 6. That is, when the cover closes the disk drive 11, the width W1, which is the width of the clearance between the opposite side 10a and the outer side 1c opposed by the opposite side 10a, is made larger than the width W2, which is the width of the clearance between the shaft side 10e and the shaft-side outer side 1f opposed by the shaft side 10e. Further, the width W1 is made larger than the Width W3, which is the width of the clearance between the shaft side 10b or 10c of the cover 10 with which the shaft 15 engages and the shaft-side outer side 1d or 1e with which the shaft 15 engages. In the present embodiment, the width W2 and the width W3 are set to the same size. They do not have to have the same size but need to be at least smaller than the width W1. Further, although the shaft side 10b and the shaft-side outer side 1d, the shaft side 10c and the shaft-side outer side 1e, and the shaft side 10e and the shaft-side outer side 1f respectively oppose each other, they oppose each other with a clearance therebetween or without a clearance.

Thus, even if a user accidentally bumps the support member 42 against the wall or like when carrying the notebook computer by holding the handle 4 with the user's hand and deforms a front area 20 of the first cabinet 1 and its surroundings locally in the direction indicated by the arrow D, there is a strong possibility that the clearance between the opposite side 10a and the outer side 1c remains present due to the above configuration. That is, since the clearance 12a having the width W1 larger than the width W2 is formed between the opposite side 10a and the outer side 1c, there is a strong tendency for the clearance to be maintained between the opposite side 10a and the outer side 1c when the outer side 1c is deformed in the direction indicated by the arrow D. Therefore, it is possible to reduce the possibility of the development of trouble in opening and closing the cover 10.

In contrast, when the width W1 of the clearance 12a is made smaller (e.g., same as the size of the width W2), there is a strong possibility that the clearance 12a between the opposite side 10a and the outer side 1c disappears when the front area 20 of the first cabinet 1 and its surroundings are locally deformed in the direction indicated by the arrow D. Consequently, there is a strong possibility that the cover 10 cannot be opened or closed smoothly or it cannot be opened or closed completely.

In the present embodiment, although the width W1 of the clearance 12a is set to 1.0 mm and the width W2 of the clearance 12d and the width W3 of the clearance 12b are respectively set to 0.4 mm (these values are an example), it is possible to ensure a larger margin against the local deformation in the direction indicted by the arrow D by further increasing the width W1.

In the cover opening and closing device according to the present embodiment, the clearance 12a closest to the protrusions (the handle 4, the support members 41 and 42) on the first cabinet 1 is made to have a larger width than other clearances among the clearances 12 between the cover 10 and the first cabinet 1. Thus, even when the protrusions are bumped accidentally against the wall or the like and the first cabinet 1 in the vicinity of the protrusions is locally deformed, it is possible to absorb the deformation. Therefore, it is possible to reduce the possibility of the development of trouble in opening and closing the cover 10.

Further, according to the present embodiment, there is no need for the reinforcement to be made to prevent the cover 10 from being deformed when it receives an impact. Thus, without increasing the weight and the size of the first cabinet 1 or a notebook computer including the first cabinet 1, it is possible to achieve a structure that can absorb a local deformation caused by a certain amount of impact.

Although the handle 4, the support members 41 and 42 have been described in the present embodiment as examples of the protrusions, the structure is also effective for a variety of protrusions such as an optional device. Examples of the optional device include a TV tuner unit based on the PCMCIA (Personal Computer Memory Input Output Association) standard attached to a PC card slot placed on a side surface of the first cabinet 1.

Further, the width of the clearance 12a is made larger than those of other clearances in the present embodiment. However, when the protrusions are placed on a portion other than the side surface 1b of the first cabinet 1, the same effects as the present embodiment can be achieved by increasing the width of a clearance closest to the portion where the protrusions are placed.

In the present embodiment, the concave portion formed on the first cabinet 1 at the position where the disk drive 11 is placed is an example of the opening of the present invention. The first cabinet 1 in the present embodiment is an example of the cabinet of the present invention. The cover 10 in the present embodiment is an example of the cover of the present invention. The shaft 15 in the present embodiment is an example of the shaft of the present invention. The opposite side 10a of the cover 10 in the present embodiment is an example of the opposite side of the present invention. The outer side 1c in the present embodiment is an example of the outer side of the present invention. The the shaft side 10e in the present embodiment is an example of the shaft side of the present invention. The shaft-side outer side 1d or 1e in the present embodiment is an example of the shaft-side outer side of the present invention. The side surface 1b in the present embodiment is an example of the side wall of the present invention. The side surface 1b in the present embodiment is an example of the one side wall of the present embodiment.

The cover opening and closing device of the present invention is useful for devices including a concave portion where a cover can open and close. Its application examples include an information processing unit such as a notebook computer.

With respect to the present embodiment, the following appendixes will be disclosed.

[Appendix 1]

A cover opening and closing device comprising:
a cabinet including an opening; and
a cover including a shaft that supports the opening such that the opening can be opened and closed,
wherein the cover further includes a cover main body capable of covering at least part of the opening, a shaft side in the vicinity of the shaft and an opposite side opposing the shaft side through the cover main body, and
when the cover closes the opening, a clearance width between the opposite side and an outer side of the opening opposed by the opposite side is larger than a clearance width between the shaft side and a shaft-side outer side of the opening opposed by the shaft side.

[Appendix 2]

The cover opening and closing device according to Appendix 1,
wherein the cabinet further includes a plurality of side walls orthogonal to the cover main body when the cover closes the opening, and
one of the plurality of side walls is provided with a holding portion that can be held to carry the cabinet.

[Appendix 3]

The cover opening and closing device according to Appendix 2, wherein
the opposite side is provided closer to the one of the plurality of side walls of the cabinet than the shaft side.

[Appendix 4]

An information processing unit comprising: an cabinet including a disk drive including an opening for inserting and removing a disk information medium, and an information processing portion for exchanging an information signal with the disk drive; and the cover opening and closing device according to any one of Appendixes 1 to 3.

The invention may be embodied in other forms without departing from the spirit of essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A cover opening and closing device comprising:
a cabinet including an opening defined by a peripheral sidewall; and
a cover including a shaft that supports the cover such that the opening can be opened and closed,
wherein the cover further includes a cover main body that is composed of a single member and in a closed position is disposed within a boundary of the peripheral sidewall and substantially covers the opening, the cover main body having a shaft side in the vicinity of the shaft and an opposite side opposing the shaft side through the cover main body, and
when the cover closes the opening, a clearance width between the opposite side and a portion of the peripheral sidewall of the opening closest to the opposite side when viewed in a plan view is larger than a clearance width between the shaft side and a portion of the peripheral sidewall of the opening closest to the shaft side when viewed in a plan view.

2. The cover opening and closing device according to claim 1, wherein the cabinet further includes a plurality of side walls orthogonal to the cover main body when the cover closes the opening, and one of the plurality of side walls is provided with a holding portion that can be held to carry the cabinet.

3. The cover opening and closing device according to claim 2, wherein the opposite side is provided closer to the one of the plurality of side walls of the cabinet than the shaft side.

4. An information processing device comprising:

a cabinet including a disk drive including an opening for inserting and removing a disk information medium, and an information processing portion for exchanging an information signal with the disk drive; and the cover opening and closing device according to claim 1.

5. An information processing device comprising:

a cabinet including a disk drive including an opening for inserting and removing a disk information medium, and an information processing portion for exchanging an information signal with the disk drive; and the cover opening and closing device according to claim 2.

6. An information processing device comprising:

a cabinet including a disk drive including an opening for inserting and removing a disk information medium, and an information processing portion for exchanging an information signal with the disk drive; and the cover opening and closing device according to claim 3.

* * * * *